United States Patent
Wibowo et al.

(10) Patent No.: US 11,472,739 B2
(45) Date of Patent: Oct. 18, 2022

(54) ADMIXTURE COMPOSITION TO IMPROVE STRENGTH OF CEMENT CURED PRODUCTS

(71) Applicant: Huntsman Petrochemical LLC, The Woodlands, TX (US)

(72) Inventors: Antonius Wibowo, Boortmeerbeek (BE); Howard P Klein, Austin, TX (US); Robert A Grigsby, Jr., Spring, TX (US)

(73) Assignee: Huntsman Petrochemical LLC, The Woodlands, TX (US)

(*) Notice: Subject to any disclaimer, the term of this patent is extended or adjusted under 35 U.S.C. 154(b) by 0 days.

(21) Appl. No.: 15/033,129

(22) PCT Filed: Sep. 29, 2014

(86) PCT No.: PCT/EP2014/070746
§ 371 (c)(1),
(2) Date: Apr. 29, 2016

(87) PCT Pub. No.: WO2015/062798
PCT Pub. Date: May 7, 2015

(65) Prior Publication Data
US 2016/0264465 A1 Sep. 15, 2016

Related U.S. Application Data

(60) Provisional application No. 61/897,404, filed on Oct. 30, 2013.

(30) Foreign Application Priority Data

Nov. 13, 2013 (EP) .................................... 13192758
Sep. 29, 2014 (WO) ................. PCT/EP2014/070746

(51) Int. Cl.
*C04B 24/26* (2006.01)
*C04B 28/02* (2006.01)
*C04B 40/00* (2006.01)
*C04B 24/12* (2006.01)
*C04B 103/32* (2006.01)
*C04B 103/30* (2006.01)
*C04B 103/10* (2006.01)
*C04B 103/52* (2006.01)

(52) U.S. Cl.
CPC ........ *C04B 24/2641* (2013.01); *C04B 24/121* (2013.01); *C04B 28/02* (2013.01); *C04B 40/0039* (2013.01); *C04B 2103/10* (2013.01); *C04B 2103/302* (2013.01); *C04B 2103/32* (2013.01); *C04B 2103/52* (2013.01)

(58) Field of Classification Search
CPC .............. C04B 24/2641; C04B 24/121; C04B 40/0039; C04B 28/02; C04B 2103/52; C04B 2103/10; C04B 2103/302; C04B 2103/32
See application file for complete search history.

(56) References Cited

U.S. PATENT DOCUMENTS

| | | | |
|---|---|---|---|
| 4,519,842 A | 5/1985 | Gerber | |
| 4,901,472 A | 2/1990 | Donohue et al. | |
| 4,946,904 A | 8/1990 | Akimoto et al. | |
| 4,990,190 A | 2/1991 | Myers et al. | |
| 5,017,234 A | 5/1991 | Gartner et al. | |
| 5,084,103 A | 1/1992 | Myers et al. | |
| 5,393,343 A | 2/1995 | Darwin et al. | |
| 5,707,445 A | 1/1998 | Yamato et al. | |
| 5,798,425 A | 8/1998 | Albrecht et al. | |
| 6,048,393 A | 4/2000 | Cheung et al. | |
| 6,290,772 B1 | 9/2001 | Cheung et al. | |
| 6,376,581 B1 | 4/2002 | Tanaka et al. | |
| 6,388,038 B1 | 5/2002 | Hirata et al. | |
| 6,423,785 B1 | 7/2002 | Esselborn et al. | |
| 6,762,220 B1 | 7/2004 | Yaguchi et al. | |
| 6,767,399 B2 * | 7/2004 | Peev ...................... | C04B 24/32 106/808 |
| 6,855,752 B2 | 2/2005 | Velten et al. | |
| 6,858,074 B2 | 2/2005 | Anderson et al. | |
| 6,899,177 B2 | 5/2005 | Chatterj et al. | |
| 7,160,384 B2 | 1/2007 | Jardine et al. | |
| 7,556,684 B2 * | 7/2009 | Bury ...................... | C04B 28/02 106/724 |
| 7,972,435 B2 | 7/2011 | Bury et al. | |
| 8,258,210 B2 | 9/2012 | Bury et al. | |
| 2004/0019147 A1 | 1/2004 | Haubennestel et al. | |
| 2004/0149172 A1 | 8/2004 | Jardine et al. | |
| 2009/0030139 A1 | 1/2009 | Roy et al. | |
| 2009/0218546 A1 | 9/2009 | Honert et al. | |

(Continued)

FOREIGN PATENT DOCUMENTS

| EP | 291073 A | 11/1988 |
|---|---|---|
| EP | 734359 A | 10/1996 |
| EP | 736553 A | 10/1996 |
| EP | 753488 A | 1/1997 |
| EP | 850895 A | 7/1998 |
| EP | 879 860 A | 11/1998 |
| EP | 1138696 A | 10/2001 |

(Continued)

OTHER PUBLICATIONS

Dressel D., et al. "Modern grinding aids and their influence on the hydraulic properties of GBFs", ZKG International, 2010, vol. 63, No. 2, p. 43-54, Bauverlag BV, Guetersloh Germany.

*Primary Examiner* — Jessica M Roswell
(74) *Attorney, Agent, or Firm* — Huntsman Petrochemical LLC; Aleece M. Hayes

(57) ABSTRACT

An admixture composition for use in cementitious compositions for improving the properties of the cementitious composition wherein the admixture composition comprises at least a polycarboxylate type comb-polymer dispersant and a hydroxyl amine compound selected from EDIPA (N,N-bis (2 hydroxypropyl)-N-(hydroxyethyl) amine) and optionally one or more polyhydroxyalkyl ethyleneamine compounds.

9 Claims, No Drawings

(56) References Cited

U.S. PATENT DOCUMENTS

| | | | |
|---|---|---|---|
| 2011/0306704 A1* | 12/2011 | Cheung | C04B 28/02 523/401 |
| 2013/0281577 A1* | 10/2013 | Chen | C04B 40/0039 524/5 |
| 2014/0076205 A1 | 3/2014 | Marazzani et al. | |
| 2015/0114266 A1 | 4/2015 | Vierle et al. | |

FOREIGN PATENT DOCUMENTS

| | | | |
|---|---|---|---|
| EP | 1790625 A | 5/2007 | |
| EP | 2527310 A | 11/2012 | |
| FR | 2485949 A | 1/1982 | |
| KR | 893 585 B | 4/2009 | |
| WO | 00/48961 A | 8/2000 | |
| WO | 2007/039603 A | 4/2007 | |
| WO | 2011/029711 A | 3/2011 | |
| WO | 2013/164213 A | 11/2013 | |
| WO | WO 2013/164213 * | 11/2013 | C04B 24/02 |

\* cited by examiner

ADMIXTURE COMPOSITION TO IMPROVE STRENGTH OF CEMENT CURED PRODUCTS

CROSS-REFERENCE TO RELATED APPLICATIONS

This application is the National Phase of International Application PCT/EP2014/070746 filed Sep. 29, 2014 which designated the U.S. and which claims priority to U.S. App. Ser. No. 61/897,404 filed Oct. 30, 2013 and European App. Serial No. 13192758.4 filed Nov. 13, 2013. The noted applications are incorporated herein by reference.

FIELD OF INVENTION

The invention relates to an admixture composition for use in cementitious compositions.

The invention further relates to an admixture composition for use in cementitious compositions such that the properties of cement cured products (such as cement, concrete, mortar and the like) made using said cementitious compositions are improved.

The invention further relates to an admixture composition which make it possible to reduce the amount of water in a cementitious composition comprising said admixture composition while maintaining concrete workability and improving the properties of cement cured products made using said cementitious composition.

The invention further relates to a method for making cement cured products, such as cement, concrete, mortar grout and the like with improved properties.

The invention further relates to the use of the admixture composition as cement grinding aids in the production process for making cement.

BACKGROUND OF THE INVENTION

In the recent concrete industry, enhancing concrete performance through durability and strength improvement are important. The use of admixtures, perhaps, is an important means to achieve this, by modifying properties of cement cured product such as cement, concrete, mortar, grout and the like in such a way as to obtain water reduction, improved compressive strength, modified rate of hardening and setting, and increase rate of production. Frequently, higher compressive strength can be obtained by reducing the water content of the cementitious mixtures, hence decreasing the water cement ratio (w/c).

Water reducers or often called cementitious dispersants are the most common type admixtures and at the present time, there are essentially two types of water-reducers: high-range water-reducers and conventional water-reducers.

The conventional water-reducers include polycarboxylate (e.g. modified polyacrylic acid, polyacrylic-co-maleic acid, polyvinyl alcohol) and liqnosulfonate.

High range water reducers, otherwise known as superplasticizers, which usually consist of a naphthalene sulphonate formaldehyde condensate (NSF), melamine sulphonate formaldehyde condensate (MSF), or comb-polymer dispersant, allow a 15-30% water reduction.

Various substances in the art have been used to enhance the strength of the cement cured products such as triethanolamine (TEA), methyl diethanolamine (MDEA), diethanolisopropanolamine (DEIPA), triisopropanolamine (TIPA), tetra hydroxylethyl ethylenediamine (THEED).

FR 2,485,949 discloses an agent comprising tetrahydroxyethylene diamine along with ethylene diamine derivatives for enhancing the strength of cement cured product such as mortar and concrete, in which Portland cement, blended cement, etc, was used.

U.S. Pat. No. 4,401,472 (Gerber et al.) discloses an admixture comprising a poly(hydroxyalkylated)polyethyleneamine or a poly(hydroxyalkylated)polyethyleneimine or mixture thereof, wherein the admixture is sufficient to increase compressive strength of the concrete hardened mixes.

U.S. Pat. No. 4,519,842 (Gerber et al.) discloses an additive comprising an admixture of poly(hydroxyalkylated) polyamine, alkoxylated poly(hydroxyalkylated)polyamine, hydroxylated derivatives of the compound hydrazine, 1,2-diaminopropane and polyglycoldiamine and mixture thereof, wherein the admixture is effective to increase compressive strength of concrete.

U.S. Pat. Nos. 4,990,190, 5,017,234 and 5,084,103 (Myers et al.) describe trihydroxyalkylamines such as triisopropanolamine (TIPA) and N,N-bis(2-hydroxyethyl)-2-hydroxypropylamine (DEIPA) improve 7 and 28 days compressive strength of Portland cement, particularly Portland cement containing at least 4% $C_4AF$.

U.S. Pat. No. 6,290,772 (Cheung et al.) discloses N,N-bis-(2-hydroxyethyl)-2-hydroxypropylamine (DEIPA) and N,N-bis-2-hydroxypropyl)-2-hydroxyethylamine (EDIPA) improve early strength (1 and 3 days) in addition to late strength enhancement (7 and 28 days) in Portland cement as well as blended cement.

U.S. Pat. No. 6,899,177 (Chatterj et al) describes a method of cementing subterranean zone penetrated a well bore comprising a cement composition comprising hydraulic cement, sufficient water to form slurry and a hydroxylamine selected from the group consisting of TIPA, N,N-bis-(2-hydroxyethyl)-2-hydroxypropylamine (DEIPA) and N,N-bis-2-hydroxypropyl)-2-hydroxyethylamine (EDIPA)

In addition to this, a number of approached have been identified by providing chemical composition containing water reducer and amine derivatives to achieve a rapid level of strength development:

U.S. Pat. No. 6,767,399 (Peev et al.) describes admixture compositions includes a superplasticizers, thiocyanic acid, water soluble alkalonamines and ethylene oxide adducts of ethylenediamine and Morpholine derivatives.

U.S. Pat. No. 7,972,435 (Burry et al.) describes a strength improvement admixture comprising a strength improvement additive, polycarboxylate dispersant, wherein the strength improvement additive selected from the group consisting of poly(hydroxyalkylated)polyethyleneamines, poly(hydroxyalkylated)polyethyleneimines, hydrazine, 1-2-diaminopropane, polydiglycoldiamine, poly(hydroxyalyl)amines and mixtures thereof.

U.S. Pat. No. 8,258,210 (Bury et al.) describes a strength improvement admixture comprising a strength improvement additive, polycarboxylate dispersant, set retarder, wherein the strength improvement additive selected from the group consisting of poly(hydroxyalkylated)polyethyleneamines, poly(hydroxyalkylated)polyethyleneimines, hydrazine, 1-2-diaminopropane, polydiglycoldiamine, poly(hydroxyalyl) amines and mixtures thereof.

However, neither admixture composition described in the state of the art can satisfactory increase the strength of cement cured products using the state of art admixture compositions while maintaining the consistency of the cementitious composition for making cement cured products and further reducing the amount of water required for curing.

There is a need for a further improvement of admixture compositions used in cementitious composition for making cement cured products to achieve improved strength all day strength.

AIM OF THE INVENTION

It is an object of the present invention to develop an admixture composition for use in cementitious compositions suitable for making cement cured products such as concrete. Said admixture composition especially developed to improve the properties of the cement cured product. The properties being in particular improved compressive strength (at all ages), improved rate of hardening and durability.

It is a further object of the present invention to develop an admixture composition for use in cementitious compositions suitable for making cement cured products such as concrete which makes it possible to reduce the amount of water required in the cementitious composition while maintaining concrete workability and improving the speed of curing and final strength properties of the cement cured products made using said cementitious composition.

It is a further object of the present invention to develop an admixture composition for use as cement grinding aids for improving the grinding process.

It is a further object to develop a method for making cement cured products having improved strength and durability thereby using the admixture composition of the present invention.

SUMMARY OF THE INVENTION

Surprisingly we have found that the combination of a specific hydroxylamine compound in combination with a specific dispersant selected from the group of polycarboxylate type comb polymers in an admixture composition for use in cementitious compositions gives a synergetic effect on the properties of cured cement products such as cement, concrete, mortar and the like made using said admixture composition. The improved properties are compressive strength (at all ages), improved rate of hardening and durability of the cured cement products.

According to a first aspect of the invention, an admixture composition for use in cementitious compositions for improving the properties of said cementitious composition is disclosed. said admixture composition comprising at least:
  One or more polycarboxylate type comb-polymer dispersants, and
  a hydroxyl amine compound selected from EDIPA (N,N-bis (2 hydroxypropyl)-N-(hydroxyethyl) amine) and according to formula (I):

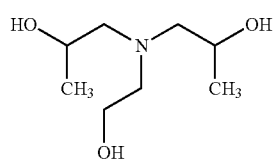

wherein the admixture composition comprises about 20% wt to about 95% wt comb-polymer dispersant and about 5% wt to about 80% wt EDIPA based on the total dry weight of admixture composition.

Preferably the admixture composition comprises about 40% wt to about 90% wt comb-polymer dispersant and about 10% wt to about 60% wt EDIPA based on the total dry weight of admixture composition.

Preferably the amount of comb polymer in the admixture composition is higher than the amount of EDIPA in the admixture composition.

Preferably the polycarboxylate type comb-polymer dispersant is selected from polymers having carboxylic groups to which pendant groups comprising alkylene oxides (i.e. ethylene oxide and propylene oxide) are attached in various compositions via linkages such as an amide, imide, ester, or ether to provide further dispersing capabilities. Suitable examples are polyether polyacrylamide, polyether poly (meth)acrylate, . . . .

The admixture composition according to the present invention is suitable for improving the durability and increasing the strength of cement cured products.

The admixture composition according to the present invention is suitable for reducing the amount of water required to make cement cured products.

According to embodiments, the admixture composition according to the invention may further comprise one or more polyhydroxyalkyl ethyleneamine compounds according to formula [II]:

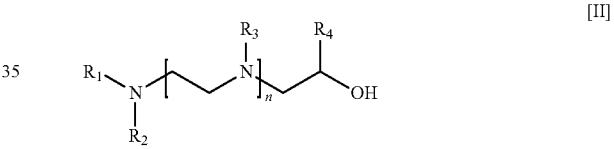

Wherein:
  $R_1$, $R_2=(C_2H_5O)_x$ or $(C_3H_7O)_x$
  $R_3=H$, $(C_2H_5O)_x$ or $(C_3H_7O)_x$
  $R_4=H$ or $CH_3$
  n=1-10
  x=1 or 2
wherein the total amount of EDIPA+polyhydroxylalkyl ethyleneamine compound(s) being present in the admixture composition is in the range 5% wt up to 80% wt calculated on the total dry weight of the admixture composition.

Preferably, the one or more polyhydroxyalkyl ethyleneamine compounds are tertiary amine compounds.

Preferably the one or more polyhydroxyalkyl ethyleneamine compounds are selected from compounds according to formula II wherein R3 is selected from the list of $(C_2H_5O)_x$ and $(C_3H_7O)_x$.

According to embodiments, part of the EDIPA used in the admixture composition is replaced by one or more polyhydroxyalkyl ethyleneamine compounds such that the total amount of EDIPA+polyhydroxylalkyl ethyleneamine compound(s) used in the admixture composition is in the range 5% wt up to 80% wt calculated on the total dry weight of the admixture composition, preferably in the range 10% wt up to 60% wt calculated on the total dry weight of the admixture composition.

The addition of a polyhydroxyalkyl ethyleneamine compound in the admixture composition has the advantage that a further enhancement in strength of cement cured product may be achieved when the admixture composition is added to a cementitious composition.

According to embodiments, the admixture composition according to the invention further comprises a polyhydroxyalkyl ethyleneamine compound according to formula [II] and is selected from aminoethylethanolamine (AEEA), ethylenediamine (EDA), diethylenetriamine (DETA), triethylene tetramine (TETA), tetraethylene pentamine (TEPA), pentaethylene hexamine (PEHA), and high molecular weight ethyleneamine (e.g. Ethylenamine E100, sold by HUNTSMAN) and mixture thereof.

According to embodiments, the admixture composition according to the invention may further comprise a defoamer or other additives such as air entraining agents, pigment or colorants, retarder, viscosity modifier, anti shrinkage additives. Said additives may enhance the performance of cement cured product. Defoamer or air detrainers, are usually used to decrease the air content in the cementitious composition According to embodiments, the admixture composition according to the invention may further comprise an aqueous and/or organic solvent.

Further to the first aspect of the invention, a cementitious binder is disclosed which comprises the admixture composition according to the invention.

Preferably the amount of admixture composition added to the cementitious binder is in the range of at least 0.01% wt up to 2% wt, more preferably in the range of at least 0.1% wt up to 1% wt based on the total dry weight of the cementitious binder (cement powder).

Preferably the total amount of EDIPA in the cementitious binder is in the range of about 0.0005% wt up to 1.6% wt based on total dry weight by weight of cementitious binder, more preferably in the range of about 0.005% wt up to 0.8% wt based on total dry weight by weight of cementitious binder.

Preferably the total amount of comb polymer dispersant in the cementitious binder is in the range of about 0.002% wt up to 1.9% wt based on total dry weight by weight of cementitious binder, more preferably in the range of about 0.02% wt up to 0.95% wt based on total dry weight by weight of cementitious binder.

Still further to the first aspect of the invention, a cementitious composition comprising the admixture composition according to the invention is disclosed.

Preferably the cementitious composition is comprising at least:
  a) a cementitious binder containing the admixture of the invention, and
  b) water, and optional
  c) aggregates and/or filler material According to embodiments, the admixture composition may be incorporated (added) into various cementitious compositions to improve strength of cement cured product meaning that said cementitious composition comprises a cementitious binder; water; admixture composition in accordance with present invention, and optionally aggregates. The aggregates may be selected from cement, mortar, epoxy mortar, grout, and concrete.

The amount of comb-polymer dispersant used in the admixture composition of the present invention depends on number of factors including the type of cementitious binders used, the mix composition (i.e. binder or cement content, water to cement ratio) and the amount of consistency desired (i.e. low, moderate and high slump).

Furthermore, the use of the admixture composition according to the invention is disclosed for use as an additive in a cementitious binder and/or in a cementitious composition to fabricate cement cured products. Use of the admixture composition of the invention may improve (increase) the compressive strength (at all ages) of cement cured products, improve (shorten) the rate of hardening of cement cured cement products, improve the durability of the cured cement products and/or reduce the amount of water required in a cementitious composition to make cement cured products while at the same time improving the properties of the cement cured products.

According to a second aspect, a method for improving the compressive strength of cured cement products, said method comprising at least the steps of
  combining components (a)-(d) to obtain a cementitious composition
    (a) the admixture composition according to the invention, and
    (b) a cementitious binder, and
    (c) water, and optional
    (d) aggregates and/or filler material; and then
  curing the cementitious composition to obtain cement cured products According to embodiments, the admixture composition may be combined with the cementitious binder (cement) before combining the other ingredients (c)-(d).

According to embodiments, the cement cured products made according to the method of the second aspect of the invention have a significant higher compressive strength after 1 day of hardening.

According to a third aspect of the invention, cured cement products made according to the method of the second aspect of the invention are disclosed, said products having a significant higher compressive strength after 1 day of hardening.

According to a fourth aspect of the invention the use of the admixture composition according to the invention as cement grinding aids for improving the grinding process is disclosed.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying examples which illustrate, by way of example, the principles of the invention.

DEFINITIONS AND TERMS

In the context of the present invention the following terms have the following meaning:
1) The expression "cement cured product" means any hardened material or unit that is made using cement as a binder material and which is made under various condition of normal curing (exposed to room temperature and atmospheric pressure), steam curing, as well as made in subterranean zone penetrated by a well bore, having temperature from about 35 C to 250 C and pressures in the range of from about 1000 psig to about 25,000 psig. A number of applications of cement cured product include hardened materials for high rise building, roadways, bridge decks, airport runways, parking garage decks, etc.
2) The expression "water" in the cementitious compositions according to the invention may be fresh water or salt water. The tem of salt water is used herein to mean unsaturated salt solutions and saturated salt solutions including brine and seawater.

3) The expression "cement" or "cementitious binder" or "cementitious composition" refer to Portland cement, cement in accordance with European EN 197-1 and American standard ASTM C1157/C1157 M as well as API cement standard for oil well cementing, masonry cement, and may also includes limestone powder, calcined gypsum product, pozzolans, PFA pulverized fuel ash) or fly ash, GGBS (ground granulated blast furnace slag), silica fume or microsilica, metakaolin and ultra-fine amorphous colloidal silica (nano-silica), API cement having classes A, B, C, G, and H. Cements are usually powdered materials which, when mixed with water, form a "paste" that hardens slowly. If further mixed with sand it forms a "mortar" and if mixed with sand and coarse aggregate, such as rock, it forms a "concrete".

4) The expression "concrete mixtures" refer to a composition suitable for making concrete materials after hardening. These mixtures are made by combining a cementitious composition (with or without admixture composition), water, fine and coarse aggregate.

5) The expression "aggregate" is intended to include both fine aggregate and coarse aggregate, as is common in the art. Fine aggregates refer to a material wherein at least 95% of the particles has an average diameter less than 9.5 mm (¾ inch). This includes natural sand, manufactured sand, and/or a combination thereof. Coarse aggregates refer to aggregate/gravel/crushed stone (non-cementitious) that has particle size greater than 0.5 m diameter. The coarse aggregate may be natural, artificial, recycled from material previously used in construction, and/or combination thereof, but it may in some cases consist of at least partially of graded metallic material such as iron chips, or manufactured aggregate, such as slag. The precise size, purity, quality, and quantity or ranges thereof, of the fine and coarse aggregates will vary depending upon the desired use and properties of mortar or concrete.

6) The expression "consistency" refers to ability of cementitious mixtures to be poured into form without any difficulty. Consistency includes workability, flowability, moldability, fluidity cohesiveness, slump and compactability. The consistency can be measured either by means of slump test, vebe test, flow table test or specific method for cementitious mixtures for special applications, such as self compacting concrete.

7) The expression "compressive strength" refers to the stress required to cause fracture of the concrete and is measured according to standard reference test EN 12930. The concrete specimen is loaded to failure in compression testing machine and the maximum load sustained is recorded and the compressive strength of the concrete is calculated.

8) The expression "cement grinding aids" refer to grinding aids which are used to improve the production efficiency of cement grinding plants and their energy consumption. In addition, these products enhance the granulometry as well as powder flowability of the finished cement as well as the compressive strength.

9) The expression "Comb-polymer dispersants" refer to polymers comprising a carbon chain backbone and polyether side chains attached to the backbone through a functional group linkage, commonly a carboxylic ester, carboxylic amide, carboxylic imide or an ether group, to provide further dispersing capabilities. The dispersant is effective at dispersing and reducing the water content of cementitious mixtures by electrical repulsion and steric hindrance, resulting in an increase in the fluidity of the mixtures.

10) The expression % wt and wt % of a compound refer to the dry weight (mass) percentage of that compound. Unless otherwise specified the weight (mass) percentage of a compound being present in a composition and calculated as the weight of that compound divided by the total mass of the composition comprising the compound multiplied by 100%. The weight (mass) percentage of a compound may also refer to the wt % of a compound added to a composition and is calculated as the weight of that compound divided by the total mass of the composition without the compound multiplied by 100%.

DETAILED DESCRIPTION

According to a first aspect, an admixture composition is disclosed for use in cementitious compositions for improving the properties of said cementitious composition and cement cured products made from said cementitious composition.

The admixture composition according to the present invention comprises additives suitable for improving the durability and increasing the strength of cement cured products.

The admixture composition according to the present invention also comprises at least an additive suitable for reducing the amount of water required to make cement cured products.

The admixture composition according to the present invention comprises at least an hydroxyl amine compound selected from N,N-bis (2 hydroxypropyl)-N-(hydroxyethyl) amine (EDIPA) and a dispersant selected from polycarboxylate type comb polymers. The formula of EDIPA is shown below (I):

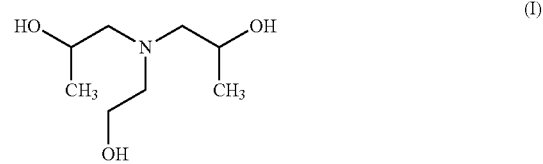

The polycarboxylate comb-polymer dispersant is used to improve strength of cement cured products by reducing the required amount of water in cementitious composition, at given consistency.

Suitable polycarboxylate comb-polymer dispersants used in the present invention are polymers having carboxylic groups to which pendant groups comprising alkylene oxides (i.e. ethylene oxide and propylene oxide) are attached in various compositions via linkages such as an amide, imide, ester, or ether to provide further dispersing capabilities.

Suitable polycarboxylate comb-polymer dispersants used in the present invention are polymers having carboxylic groups to which pendant groups comprising alkylene oxides (i.e. ethylene oxide and propylene oxide) are attached in various compositions via linkages such as an amide, imide, ester, or ether to provide further dispersing capabilities. Example of monomers having carboxylic groups are (meth) acrylic acid, maleic acid, fumaric acid, itaconic acid, or citraconic acid and their monovalent metal salts, divalent metal salts, ammonium salts and organic amine salts.

Suitable polycarboxylate comb-polymer dispersants used in the present invention are polymers having carboxylic groups to which pendant groups comprising alkylene oxides (i.e. ethylene oxide and propylene oxide) are attached in various compositions via ether linkages. Suitable examples are according to formula (III) and (IV), (V) and (VI). Formula (III) may be made from α-allyl-ω-hydroxy polyethylene glycol and maleic anhydride via radical copolymerization and as disclosed in EP 291073. Formula (IV) may be made from 4-hydroxy butyl-polyethylene glycol vinyl ether which can be copolymerized at low temperatures (<100° C.) with maleic anhydride and as further disclosed in EP 736553. Formula (V) may be made by copolymerization of isoprenol (3-methyl-3-buten-1-ol) polyethylene glycol and acrylic acid as disclosed in EP 850,895, while Formula (VI) is disclosed in (WO00/48961), in which the comb polymer dispersant is made by copolymerization of methallyl-ω-hydroxy (2-methyl-2-propene-1-ol) polyethylene glycol and maleic acid or acrylic acid.

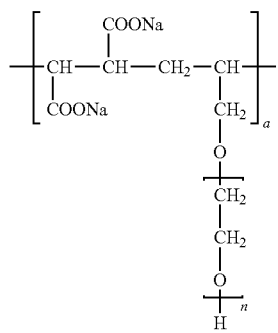
(III)

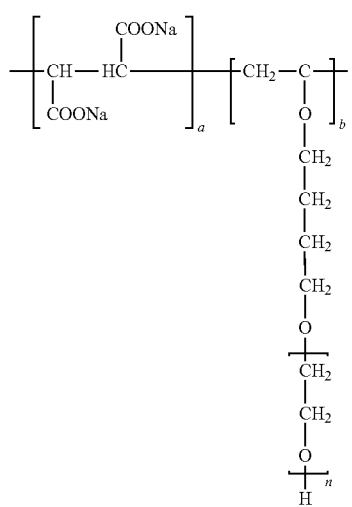
(IV)

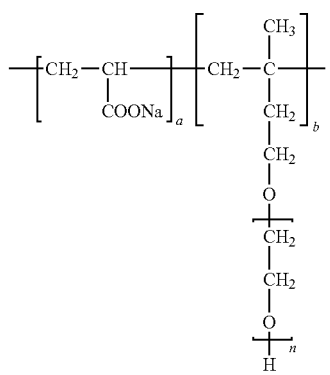
(V)

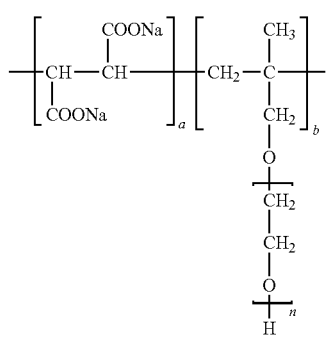
(VI)

Wherein n is a number from 1 to 150 and wherein a and be are a number from 1-10.

Suitable polycarboxylate comb-polymer dispersants used in the present invention are polymers having carboxylic groups to which pendant groups comprising alkylene oxides (i.e. ethylene oxide and propylene oxide) are attached in various compositions via ester linkages. Suitable examples are according to formula (VII), (VIII). Formula (VII) may be made from methoxy polyethylene glycol methacrylate and methacrylic acid monomer and as further disclosed in EP 753488. Formula (VIII) may be made from hydroxyl ethyl polyether methacrylate or hydroxyl propyl methacrylate and (meth)acrylic acid via radical copolymerization and as further disclosed in EP 734359.

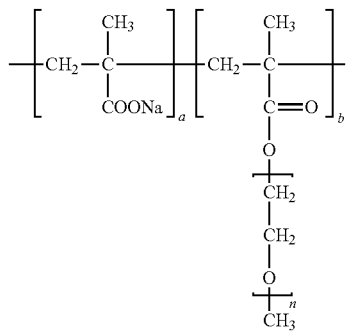
(VII)

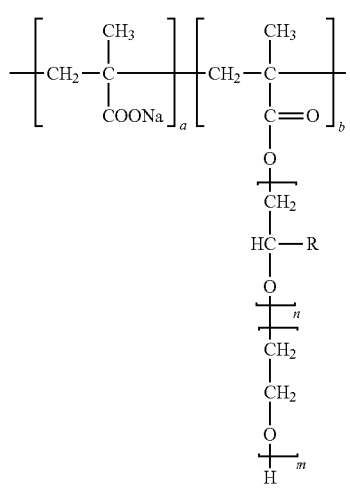

(VIII)

Wherein n and m are a number from 1 to 150 and wherein a and be are a number from 1-10.

Suitable polycarboxylate comb-polymer dispersants used in the present invention are polymers having carboxylic groups to which pendant groups comprising alkylene oxides (i.e. ethylene oxide and propylene oxide) are attached in various compositions via amide linkages or via a combination of amide/ester linkages. Suitable examples are according to formula (IX) and (X). Formula (IX) may be made from condensation of a mixture of polyacrylic acid and polyether monoamine or from free radical copolymeriation of acryl amide of methoxy polyethylene glycol and acrylic acid monomer and as disclosed in U.S. Pat. No. 5,393,343. Formula (X) may be made from condensation of a mixture of polyethermonoamine (JEFFAMINE® M2070) and methoxy polyethylene glycol (MPEG) and polyacrylic acid (MW≈4000) and as disclosed in EP 1138696.

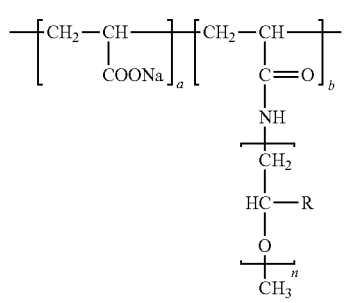

(IX)

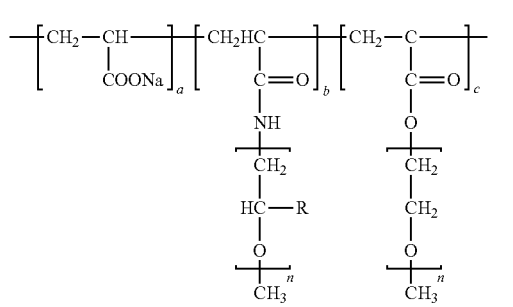

(X)

Wherein n is a number from 1 to 150 and wherein a and be are a number from 1-10.

In addition, the polycarboxylate comb-polymer dispersant according to the formula (III), (IV), (V), (VI) (VII), (VIII) can be further modified by adding the third monomer include unsaturated sulfonic acids, such as sulfoethyl (meth) acrylate, 2-methyl propanesulfonic acid (meth)acylamide, or styrenesulfonic acid, and their monovalent metal salt, divalent metal salts, ammonium salts and organic amine salts; unsaturated amides, such as (meth)acrylamide or (meth) acrylalkyl amide; vinyl esters, such as vinyl acetate or vinyl propionate; aromatic vinyls, such as styrene; and the like. The number of alkylene oxides (i.e. ethylene oxide and propylene oxide) in the polycarboxylate comb-polymer dispersants are depending upon application and desired performance (i.e. high water reduction, long workability retention). Preferably the number of alkylene oxides (n+m<15) is less than 15 when used in oil well cementing applications (where e.g. the cement is pumped to the subterranean zone), while the number of alkylene oxides is preferably greater than 15 (n+m>15) when applied in applications wherein high water reduction is required (in concrete applications).

The admixture composition according to the present invention is comprising at least:
One or more polycarboxylate type comb-polymer dispersants, and
a hydroxyl amine compound selected from EDIPA (N,N-bis (2 hydroxypropyl)-N-(hydroxyethyl) amine)
wherein the admixture composition comprises about 20% wt to about 95% wt comb-polymer dispersant and about 5% wt to about 80% wt EDIPA based on the total dry weight of admixture composition.

Preferably the admixture composition comprises about 40% wt to about 90% wt comb-polymer dispersant and about 10% wt to about 60% wt EDIPA based on the total dry weight of admixture composition.

According to embodiments the admixture composition further comprises one or more additional compounds selected from the group of polyhydroxyalkyl ethyleneamine compounds such that the admixture composition is comprising at least:
one or more polycarboxylate type comb-polymer dispersants, and
a hydroxyl amine compound selected from EDIPA (N,N-bis (2 hydroxypropyl)-N-(hydroxyethyl)amine), and
one or more polyhydroxyalkyl ethyleneamine compounds as shown in structure [II] below:

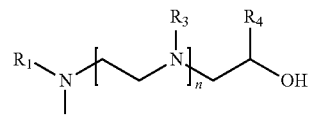

[II]

Where:
$R_1$, $R_2 = (C_2H_5O)_x$ or $(C_3H_7O)_x$
$R_3 = H$, $(C_2H_5O)_x$ or $(C_3H_7O)_x$
$R_4 = H$ or $CH_3$
$n = 1-10$
$x = 1$ or $2$ Preferably, the one or more polyhydroxyalkyl ethyleneamine compounds are tertiary amine compounds.

Preferably the one or more polyhydroxyalkyl ethyleneamine compounds are selected from compounds according to formula II wherein $R_3$ is selected from the list of $(C_2H_5O)_x$ and $(C_3H_7O)_x$.

The addition of at least one polyhydroxyalkyl ethyleneamine compound in the admixture composition has the advantage that a significant further enhancement in strength of cement cured product may be achieved when the admixture composition is added to a cementitious composition.

Suitable polyhydroxyalkyl ethyleneamine compounds include, but are not limited, aminoethylethanolamine (AEEA), ethylenediamine (EDA), diethylenetriamine (DETA), triethylene tetramine (TETA), tetraethylene pentamine (TEPA), pentaethylene hexamine (PEHA), and high molecular weight ethyleneamine (e.g. Ethylenamine E100, sold by HUNTSMAN), and mixture thereof. These products can be made by alkoxylating ethyleneamine. Preferred alkylene oxides (AO) for the alkoxylation of ethyleamine in the present invention include ethylene oxide and propylene oxide.

The amount of polyhydroxylalkyl ethyleneamine compound(s) used in the admixture composition of the present invention is such that the total amount (sum) of EDIPA and polyhydroxylalkyl ethyleneamine compound(s) being present in the admixture composition is in the range 5% wt up to 80% wt calculated on the total dry weight of the admixture composition, preferably in the range 10% wt up to 60% wt calculated on the total dry weight of the admixture composition.

According to embodiments, the admixture composition may further comprise a defoamer or other additives such as air entraining agents, pigment or colorants, retarder, viscosity modifier, anti shrinkage, may be added in admixture compositions or present to enhance the performance of cement cured product. Defoamer or air detrainers, are usually used to decrease the air content in the cementitious composition. Example of defoamers that can be utilized in the present invention include, but are not limited to tributyl phosphatem dibutyl phtalare, octyl alcohol, water insolubele esters of carbonic and boric acid, acetylenic diols, ethylene oxide-propylene oxide block or random copolymers, and silicones.

According to embodiments, the admixture composition of the present invention may be supplied in a pure concentrated form, or diluted in aqueous or organic solvents Further according to the first aspect, a cementitious binder (cement powder) is disclosed which comprises the admixture composition of the present invention or in other words a cementitious binder to which the admixture composition is added.

The admixture composition according to the present invention may be added to a cementitious binder (cement). The admixture composition may be added to (combined with) the cementitious binder before making a cementitious composition or alternatively may be added as an additive at the stage of combining the different ingredients (sand, water, . . . ) used for making the cementitious composition.

Preferably the amount of admixture composition added to the cementitious binder is in the range of at least 0.01% wt up to 2% wt, more preferably in the range of at least 0.1% wt up to 1% wt based on the total dry weight of the cementitious binder (cement powder).

Preferably the total amount of EDIPA (or alternatively the total amount (sum) of EDIPA and polyhydroxylalkyl ethyleneamine compound(s)) in the cementitious binder is in the range of about 0.0005% wt up to 1.6% wt based on total dry weight by weight of cementitious binder, more preferably in the range of about 0.005% wt up to 0.8% wt based on total dry weight by weight of cementitious binder.

Preferably the total amount of comb polymer dispersant in the cementitious binder is in the range of about 0.002% wt up to 1.9% wt based on total dry weight by weight of cementitious binder, more preferably in the range of about 0.0.2% wt up to 0.95% wt based on total dry weight by weight of cementitious binder.

Further according to the first aspect, a cementitious composition is disclosed which comprises the admixture composition of the present invention. Said cementitious composition being a composition ready for making cement cured products. Said cementitious composition may comprise at least:

(a) the admixture composition according to the invention,
(b) a cementitious binder, and
(c) water, and optional
(d) aggregates and/or filler material According to embodiments, the admixture composition may be incorporated (added) into various cementitious compositions to improve strength of cement cured product meaning that said cementitious composition comprises a cementitious binder; water; admixture composition in accordance with present invention, and optionally aggregates. The aggregates may be selected from cement, mortar, epoxy mortar, grout, and concrete.

The amount of comb-polymer dispersant used in the admixture composition of the present invention depends on number of factors including the type of cementitious binders used, the mix composition (i.e. binder or cement content, water to cement ratio) and the amount of consistency desired (i.e. low, moderate and high slump).

Further according to the first aspect, the use of the admixture composition according to the invention as an additive in a cementitious binder and/or in a cementitious composition to fabricate cement cured products. Said cement cured products may be any hardened material made under various condition of normal curing, steam curing, as well as made in subterranean zone penetrated by a well bore, having temperature from about 35° C. to 250° C. and pressures in the range of from about 1000 psig to about 25,000 psig. A number of applications of cement cured product include hardened materials for high rise building, roadways, bridge decks, airport runways, parking garage decks, etc.

According to embodiments, the admixture composition according to the invention may be used to improve (increase) the compressive strength (at all ages) of cement cured products.

According to embodiments, the admixture composition according to the invention may be used to improve (shorten) the rate of hardening of cement cured cement products.

According to embodiments, the admixture composition according to the invention may be used to improve the durability of the cured cement products.

According to embodiments, the admixture composition according to the invention may be used to reduce the amount of water required in a cementitious composition to make cement cured products while at the same time improving the properties of the cement cured products.

According to embodiments, a variety of cementitious binders can be utilized in the cementitious compositions according to the invention. Examples include Portland cement, cement in accordance with European and American standard as well as API cement standard for oil well cementing, masonry cement, and may also includes limestone powder, calcined gypsum product, pozzolans, PFA pulverized fuel ash) or fly ash, GGBS (ground granulated blast-furnace slag), silica fume or microsilica, metakaolin and ultrafine amorphous colloidal silica (nano-silica), API cement having classes A, B, C, G, and H.

According to a second aspect of the invention a method for improving the compressive strength of cured cement products is disclosed. Said method comprising at least the steps of combining components (a)-(d) to obtain a cementitious composition
(a) an admixture composition, and
(b) a cementitious binder, and
(c) water, and optional
(d) aggregates and/or filler material; and then
curing the cementitious composition to obtain cement cured products characterized in that the admixture composition is comprising at least a polycarboxylate type comb-polymer dispersant and a hydroxyl amine compound selected from EDIPA as disclosed in the first aspect of the invention.

According to embodiments, the admixture composition may be combined with the cementitious binder (cement) before combining the other ingredients (c)-(d).

According to embodiments, the amount of comb-polymer dispersant present in the admixture composition depends on number of factors including the type of cementitious binders used, the mix composition (i.e. binder or cement content, water to cement ratio) and the amount of consistency desired (i.e. low, moderate and high slump).

Preferably the amount of admixture composition added to the cementitious binder is in the range of at least 0.01% wt up to 2% wt, more preferably in the range of at least 0.1% wt up to 1% wt based on the total dry weight of the cementitious binder (cement powder).

Preferably the total amount of EDIPA (or alternatively the total amount of EDIPA and the amount of polyhydroxylalkyl ethyleneamine compound(s)) in the cementitious binder is in the range of about 0.0005% wt up to 1.6% wt based on total dry weight by weight of cementitious binder, more preferably in the range of about 0.005% wt up to 0.8% wt based on total dry weight by weight of cementitious binder.

Preferably the total amount of comb polymer dispersant in the cementitious binder is in the range of about 0.002% wt up to 1.9% wt based on total dry weight by weight of cementitious binder, more preferably in the range of about 0.02% wt up to 0.95% wt based on total dry weight by weight of cementitious binder.

Preferably the admixture composition is comprising at least:
one or more polycarboxylate type comb-polymer dispersants, and
a hydroxyl amine compound selected from EDIPA (N,N-bis (2 hydroxypropyl)-N-(hydroxyethyl)amine), and
one or more polyhydroxyalkyl ethyleneamine compounds as shown in structure [II] below:

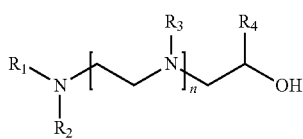

[II]

Wherein:
$R_1$, $R_2$=$(C_2H_5O)_x$ or $(C_3H_7O)_x$
$R_3$=H, $(C_2H_5O)_x$ or $(C_3H_7O)_x$
$R_4$=H or $CH_3$
n=1-10
x=1 or 2 and wherein the amount of comb-polymer dispersant is in the range 20% wt to about 95% wt and the amount of EDIPA+polyhydroxylalkyl ethyleneamine used in the admixture composition is in the range 5% wt up to 80% wt calculated on the total dry weight of the admixture composition.

Preferably, the one or more polyhydroxyalkyl ethyleneamine compounds are tertiary amine compounds.

Preferably the one or more polyhydroxyalkyl ethyleneamine compounds are selected from compounds according to formula II wherein $R_3$ is selected from the list of $(C_2H_5O)_x$ and $(C_3H_7O)_x$.

Preferably the amount of EDIPA and the amount of polyhydroxylalkyl ethyleneamine used in the admixture composition is hi the range 10% wt up to 60% wt calculated on the total dry weight of the admixture composition.

The addition of a polyhydroxyalkyl ethyleneamine compound in the admixture composition has the advantage that a further enhancement in strength of cement cured product may be achieved when the admixture composition is added to a cementitious composition.

Suitable polyhydroxyalkyl ethyleneamine compounds include, but are not limited, amino ethylethanolamine (AEEA), ethylenediamine (EDA), diethylenetriamine (DETA), triethylene tetramine (TETA), tetraethylene pentamine (TEPA), pentaethylene hexamine (PEHA), and high molecular weight ethyleneamine (ethylenamine E100, sold by HUNTSMAN), and mixture thereof. These products can be made by alkoxylating ethyleneamine. Preferred alkylene oxides (AO) for the alkoxylation of ethyleamine in the present invention include ethylene oxide and propylene oxide.

The amount of polyhydroxylalkyl ethyleneamine used in the admixture composition of the present invention preferably comprises about 5% wt to about 95% wt calculated on the total dry weight of EDIPA+polyhydroxylalkyl ethyleneamine.

According to embodiments, the admixture composition may further comprise a defoamer or other additives such as air entraining agents, pigment or colorants, retarder, viscosity modifier, anti shrinkage, may be added in admixture compositions or present to enhance the performance of cement cured product. Defoamer or air detrainers, are usually used to decrease the air content in the cementitious composition. Example of defoamers that can be utilized in the present invention include, but are not limited to tributyl phosphate dibutyl phtalate, octyl alcohol, water insoluble esters of carbonic and boric acid, acetylenic diols, ethylene oxide-propylene oxide block or random copolymers, and silicones.

According to embodiments, the admixture composition of the present invention may be supplied in a pure concentrated form, or diluted in aqueous or organic solvents According to a third aspect of the invention, cement cured products made according to the method of the second aspect of the invention are disclosed, said products having a significant higher compressive strength after 1 day, preferably a compressive strength at day 1 of at least 50% higher than the cement cured product without addition of the admixture composition according to the invention and/or a compressive strength at 28 days of at least 20% higher than the cement cured product without addition of the admixture composition according to the invention.

According to a fourth aspect of the invention the use of the admixture composition according to the invention as cement grinding aids for improving the grinding process is disclosed. Preferably the amount of admixture composition (dry weight) added to the cement (dry weight) is in the range of 0.01% wt up to 2% wt, preferably in the range of 0.1% wt up to 1% wt calculated on the dry weight of the cement powder.

The invention is illustrated with the following examples.

EXAMPLES

Examples of admixture compositions were tested for the effect of their addition in cementitious compositions. The compressive strength of concrete made using said admixture composition was evaluated.

The different compounds used to make comparative admixture compositions and admixture compositions according to the invention (a comb-polymer dispersant and a strength increasing additive selected from different hydroxyl amine compounds) are listed in Table 1.

Concrete mixtures were made with and without adding admixture compositions, in accordance with BS 1881-125. Design of normal concrete mixtures, published by Building Research Establishment (BRE) was followed to determine the amount of cementitious compositions.

Concrete mixtures without admixture composition utilized 7.719 kg of sand, 9.45 kg of aggregate, 3.118 kg of cement, and 1.883 kg water, while concrete mixture with admixture composition utilized 7.719 kg sand mixed with 9.45 kg aggregate, 3.118 kg cement and 1.543 kg water. Cement type II 32.5N B-M/SV from CBR was used in all examples.

Concrete mixtures containing a polycarboxylate dispersant which is not a comb polymer type dispersant (SP3) utilized 7.719 kg sand, 9.45 kg aggregate, 3.118 kg cement, and 1.883 kg water.

TABLE 1

| Compound Name | Chemical formula | Dosage, wt % added (*) |
|---|---|---|
| Dispersant | | |
| SP1 | Comb-polymer dispersant: Polyether (Mw = 2000) polyacrylamide | 0.2% |
| SP2 | Comb-polymer dispersant: Methoxy Polyethylene Glycol Methacrylate (Mw = 1000)-co-methacrylic acid, Na salt | 0.2% |
| SP3 | Polycarboxylate dispersant: (modified polyacrylic acid 5000 Mw) | 0.5% |
| Amine compound | | |
| EDIPA | (N,N-bis (2 hydroxypropyl)-N-(hydroxyethyl) amine) | 0.1% |
| TIPA | Tri-isopropanolamine | 0.1% |
| THEED | Tetra hydroxyethyl ethylenediamine | 0.1% |
| THPED | Tetra Hydroxypropyl ethylenediamine | 0.1% |
| PHEDETA | Penta hydroxyethyl diethylene triamine | 0.1% |

(*) wt % of the compound added (dry weight) to the dry weight of the cement

The hydroxyl amine compound was added to the concrete mixture in a concentration of about 0.1% by weight calculated on the total weight of cementitious binder composition used for making the concrete mixture.

The dispersant compound was added to the concrete mixture in a concentration of about 0.2% by weight calculated on the total weight of cementitious binder composition used to for making the concrete mixture.

Defoamers were added to the concrete mixture to ensure that the concrete air content (measured by air pressure method in accordance with BS EN 12350-7) is less than 2%. A consistency of 150±10 mm was determined using slump cone in accordance with BS EN 12350-2. After the determination of air content, the concrete mixtures were poured in steel mould and allowed to cure. Compressive strength was determined after 1, 3, 7 and 28 days, in accordance with BS EN 12390-3.

Example 1

Comparison Admixture Compositions Containing EDIPA with and without Dispersant This example illustrates the comparison of concretes made using an admixture composition containing EDIPA (N,N-bis (2 hydroxypropyl)-N-(hydroxyethyl) amine) without cementitious dispersant as described in U.S. Pat. Nos. 6,048,393 and 6,899,177 and EDIPA with a dispersant according to the invention (SP1). Concretes made using the admixture compositions according to the invention comprising comb-polymer dispersant (SP1) and EDIPA showed significant higher compressive strength than concretes made using an admixture compositions which contains EDIPA without SP1 and concretes made using an admixture compositions which contains SP1 without EDIPA. The results indicated that unexpected synergy admixture compositions from present invention containing cementitious dispersant selected from SP1 and EDIPA was achieved.

TABLE 2

| Admixture compositions | Compressive strength, MPa* | | | | Increase compressive strength, % | | | |
|---|---|---|---|---|---|---|---|---|
| | 1 day | 3 days | 7 days | 28 days | 1 day | 3 days | 7 days | 28 days |
| None | 3.4 | 10.7 | 17.5 | 26.3 | 100 | 100 | 100 | 100 |
| EDIPA | 5.0 | 11.5 | 21.4 | 31.1 | 145 | 107 | 122 | 118 |
| SP1 | 2.5 | 11.3 | 18.7 | 31.3 | 71 | 105 | 107 | 119 |
| Present Invention | | | | | | | | |
| SP1 + EDIPA | 6.4 | 16.7 | 27.5 | 38.9 | 185 | 157 | 157 | 148 |

*The compressive strength is measured according to standard reference test EN 12930 using a sample having a dimension of 100 × 100 × 100 mm.

Example 2

Comparison Admixture Compositions Containing Different Hydroxyl Amine Compounds in Combination with a Polycarboxylate Type Comb-Polymer Dispersant (SP1)

This example illustrates the compressive strength of concretes made using a cementitious composition containing an hydroxylamine additive in the presence of a comb-polymer dispersant selected from SP1. The example according to the invention was made using an admixture composition containing an hydroxyl amine compound selected from EDIPA and a comb polymer dispersant selected from SP1. The comparative examples were made in accordance with admixture compositions described in U.S. Pat. No. 7,972,435 comprising TREED or TIPA in the presence of cementitious dispersant (SP1).

TABLE 3

| Admixture compositions | Compressive strength, MPa* | | | | Increase compressive strength, % | | | |
|---|---|---|---|---|---|---|---|---|
| | 1 day | 3 days | 7 days | 28 days | 1 day | 3 days | 7 days | 28 days |
| SP1 | 2.5 | 11.3 | 18.7 | 31.3 | 100 | 100 | 100 | 100 |
| SP1 + TIPA | 4.0 | 15.3 | 23.4 | 34.0 | 163 | 136 | 125 | 109 |
| SP1 + THEED | 3.4 | 15.5 | 27.8 | 37.6 | 137 | 138 | 149 | 120 |
| Invention | | | | | | | | |
| SP1 + EDIPA | 6.4 | 16.7 | 27.5 | 38.9 | 260 | 149 | 147 | 124 |

*The compressive strength is measured according to standard reference test EN 12930 using a sample having a dimension of 100 × 100 × 100 mm.

Example 3

Comparison Admixture Compositions Containing Different Hydroxyl Amine Compounds in Combination with a Comb-Polymer Dispersant Selected from a Polycarboxylate Type Comb-Polymer an (SP2)

This example illustrates the compressive strength of concretes made using a cementitious composition according to the present invention comprising comb-polymer dispersant of SP2 and EDIPA, and composition according to the present invention comprising comb-polymer dispersant of SP2 and hydroxyl amine compounds EDIPA and TREED (at ratio of 50:50).

The results are illustrated in Table 4. The use of admixture composition in accordance present invention showed higher compressive strength than use of admixture composition according to state of the art using an admixture composition containing a dispersant selected from SP2 and no hydroxylamine compound.

TABLE 4

| Admixture compositions | Compressive strength, MPa* | | | | Increase compressive strength, % | | | |
|---|---|---|---|---|---|---|---|---|
| | 1 day | 3 days | 7 days | 28 days | 1 day | 3 days | 7 days | 28 days |
| SP2 | 5.8 | 17.0 | 27.1 | 39.7 | 100 | 100 | 100 | 100 |
| Present inventions | | | | | | | | |
| SP 2 + EDIPA | 8.9 | 19.0 | 30.9 | 39.9 | 155 | 112 | 114 | 101 |
| SP 2 + EDIPA/ THEED | 7.2 | 20.2 | 32.7 | 43.0 | 124 | 119 | 121 | 108 |

*The compressive strength is measured according to standard reference test EN 12930 using a sample having a dimension of 100 × 100 × 100 mm.

Example 4

Comparison Admixture Compositions Containing Hydroxyl Amine Compounds in Combination with a Dispersant Selected from SP3 (not According to the Invention)

Concrete materials made using a cementitious composition containing a dispersant selected from SP3 (as described in U.S. Pat. No. 7,972,435) and a cementitious composition containing a dispersant selected from SP3 and EDIPA were evaluated.

As seen in Table 5, the compressive strength concrete materials using admixture compositions comprising dispersant SP3 and EDIPA, did not show significant improvement over admixture containing EDIPA without cementitious dispersant.

TABLE 5

| Admixture compositions | Compressive strength, MPa* | | | | Increase compressive strength, % | | | |
|---|---|---|---|---|---|---|---|---|
| | 1 day | 3 days | 7 days | 28 days | 1 day | 3 days | 7 days | 28 days |
| None | 3.4 | 10.7 | 17.5 | 26.3 | 100 | 100 | 100 | 100 |
| EDIPA | 5.0 | 11.5 | 21.4 | 31.1 | 145 | 107 | 122 | 118 |
| SP 3 + EDIPA | 4.5 | 12.0 | 22.0 | 32.0 | 132 | 112 | 126 | 122 |

*The compressive strength is measured according to standard reference test EN 12930 using a sample having a dimension of 100 × 100 × 100 mm.

Example 5

Comparison Admixture Compositions Containing Hydroxyl Amine Compounds Selected from EDIPA in Combination with a Polyhydroxyalkyl Ethyleneamine Compound and a Polycarboxylate Comb Polymer Dispersant Selected from SP1

This example illustrate further enhance performance of EDIPA in combination with polyhydroxyalkyl ethyleneamine, in the presence of comb-polymer dispersant (SP1). Three types of polyhydroxyalkyl ethyleneamine, namely THEED, THPED and PHEDETA are used in the examples. The ratio of EDIPA and polyhydroxyalkyl ethyleneamine is, but not limited to, is at about 50:50.

Table 6 illustrates that admixture composition of the present invention improved compressive strength of cement cured products, especially with respect to compressive strength values using prior art chemical admixture compositions, as described in U.S. Pat. No. 7,972,435.

TABLE 6

| Admixture compositions | Compressive strength, MPa* | | | | Increase compressive strength, % | | | |
|---|---|---|---|---|---|---|---|---|
| | 1 day | 3 days | 7 days | 28 days | 1 day | 3 days | 7 days | 28 days |
| SP1 | 2.5 | 11.3 | 18.7 | 31.3 | 100 | 100 | 100 | 100 |
| SP1 + THEED | 3.4 | 15.5 | 27.8 | 37.6 | 137 | 138 | 149 | 120 |
| invention | | | | | | | | |
| SP 1 + EDIPA/ THEED | 8.3 | 21.4 | 30.7 | 40.8 | 338 | 189 | 164 | 130 |
| SP 1 + EDIPA/ THPED | 8.3 | 20.5 | 31.5 | 42.0 | 338 | 182 | 168 | 134 |
| SP1 1 + EDIPA/ PHEDETA | 8.8 | 22.6 | 27.1 | 39.5 | 360 | 200 | 145 | 126 |

*The compressive strength is measured according to standard reference test EN 12930 using a sample having a dimension of 100 × 100 × 100 mm.

The invention claimed is:

1. An admixture composition comprising at least a polycarboxylate type comb-polymer dispersant represented by at least one of the following formulas:

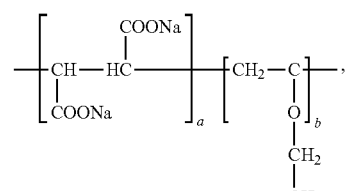
(IV)

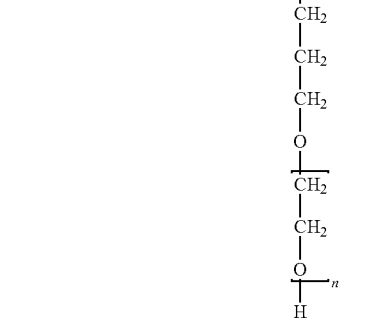
(V)

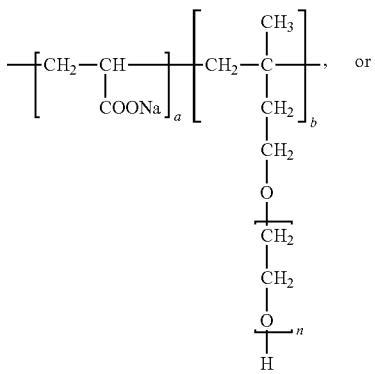
(VI)

having carboxylic groups and a carbon chain backbone and pendent groups comprising alkylene oxides attached to the carbon chain backbone via a polyether polyacrylamide or a polyether poly(meth)acrylate linkage and wherein n is a number from 1 to 150, and a and b are each a number from 1 to 10;

N,N-bis (2 hydroxypropyl)-N-(hydroxyethyl) amine (EDIPA); and at least one compound selected from a tetraethylene pentamine (TEPA), a pentaethylene hexamine (PEHA), a high molecular weight ethyleneamine, and a mixture thereof, wherein the admixture composition comprises about 20% wt to about 95% wt comb-polymer dispersant and about 5% wt to about 80% wt EDIPA, based on the total dry weight of the admixture composition.

2. The admixture composition according to claim 1, wherein the admixture composition comprises about 40% wt to about 90% wt comb-polymer dispersant and about 10% wt to about 60% wt EDIPA based on the total dry weight of admixture composition.

3. The admixture composition according to claim 1, further comprising at least one polyhydroxyalkyl ethyleneamine compound according to formula [II]:

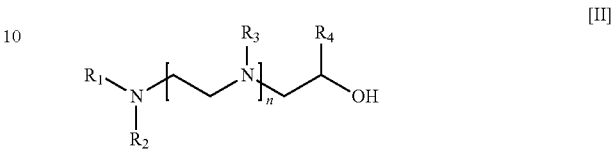
[II]

wherein:
$R_1$, $R_2$=($C_2H_5O$), ($C_2H_4O$—$C_2H_4OH$), $C_3H_6OH$ or ($C_3H_6O$—$C_3H_6OH$)
$R_3$=H, ($C_2H_5OH$), ($C_2H_4O$—$C_2H_4OH$), $C_3H_6OH$ or ($C_3H_6O$—$C_3H_6OH$)
$R_4$=H or $CH_3$
n=1-10
wherein the total amount of EDIPA and the at least one compound according to formula (II) present in the admixture composition is in the range of 5% wt to about 80% wt calculated on the total dry weight of the admixture composition.

4. The admixture composition according to claim 3, wherein the at least one compound according to formula (II) is a tertiary amine compound and $R_3$ is selected from $C_2H_5OH$, ($C_2H_4O$—$C_2H_4OH$), $C_3H_6OH$, and ($C_3H_6O$—$C_3H_6OH$).

5. The admixture composition according to claim 1, further comprising a defoamer, an air entraining agent, a pigment, a colorant, a retarder, a viscosity modifier, or an anti shrinkage additive.

6. The admixture composition according to claim 1, further comprising an aqueous and/or organic solvent.

7. A method for improving the compressive strength of a cured cement product, said method comprising at least the steps of
combining components (a)-(c), and optionally (d), to obtain a cementitious composition;
(a) the admixture composition according to claim 1,
(b) a cementitious binder, and
(c) water, and
(d) an aggregate, a filler material, or both an aggregate and a filler material; and then
curing the cementitious composition to obtain the cement cured product.

8. The method according to claim 7, wherein the admixture composition is combined with the cementitious binder before combining with component (c) or, optionally, components (c) and (d).

9. A cementitious composition comprising:
(a) a cementitious binder comprising the admixture composition according to claim 1 wherein the total amount of admixture composition added to the cementitious binder is in the range of at least 0.01% wt up to 2% wt, based on the total dry weight of the cementitious binder,
(b) water, and optionally
(c) an aggregate, a filler material, or both an aggregate and a filler material.

* * * * *